United States Patent
Jiang et al.

(10) Patent No.: US 9,261,963 B2
(45) Date of Patent: Feb. 16, 2016

(54) FEEDBACK FOR GROUNDING INDEPENDENT HAPTIC ELECTROVIBRATION

(71) Applicant: QUALCOMM Incorporated, San Diego, CA (US)

(72) Inventors: Sam Shan Jiang, Australia (AU); Christian A. Webb, Australia (AU); Craig W. Northway, Australia (AU)

(73) Assignee: QUALCOMM Incorporated, San Diego, CA (US)

( * ) Notice: Subject to any disclaimer, the term of this patent is extended or adjusted under 35 U.S.C. 154(b) by 156 days.

(21) Appl. No.: 13/973,749

(22) Filed: Aug. 22, 2013

(65) Prior Publication Data
US 2015/0054773 A1 Feb. 26, 2015

(51) Int. Cl.
  G06F 3/045  (2006.01)
  G06F 3/01   (2006.01)
  G06F 3/041  (2006.01)
  G06F 3/044  (2006.01)
(52) U.S. Cl.
  CPC ............... G06F 3/016 (2013.01); G06F 3/044 (2013.01); G06F 3/0416 (2013.01)
(58) Field of Classification Search
  None
  See application file for complete search history.

(56) References Cited

U.S. PATENT DOCUMENTS

| | | |
|---|---|---|
| 2007/0052428 A1 | 3/2007 | Van Berkel |
| 2007/0236474 A1 | 10/2007 | Ramstein |
| 2009/0262078 A1 | 10/2009 | Pizzi |
| 2009/0303175 A1 | 12/2009 | Koivunen |
| 2010/0149110 A1* | 6/2010 | Gray ............................ 345/173 |
| 2012/0116672 A1 | 5/2012 | Forutanpour et al. |
| 2012/0327006 A1 | 12/2012 | Israr et al. |
| 2014/0139327 A1* | 5/2014 | Bau et al. ................... 340/407.1 |

FOREIGN PATENT DOCUMENTS

| | | |
|---|---|---|
| EP | 2375311 A2 | 10/2011 |
| WO | 2008116642 A2 | 10/2008 |

OTHER PUBLICATIONS

International Search Report and Written Opinion—PCT/US2014/051743—ISA/EPO—Nov. 19, 2014.

* cited by examiner

Primary Examiner — Joseph Haley
Assistant Examiner — Ifedayo Iluyomade
(74) Attorney, Agent, or Firm — Haynes and Boone, LLP

(57) ABSTRACT

An apparatus for providing tactile feedback is provided. The apparatus includes a touch-sensitive screen that detects a touch input and a set of electrodes. The apparatus also includes a haptic voltage signal generator that applies a haptic signal to the set of electrodes and modifies the haptic signal based on a displacement current from the touch input to the set of electrodes. The apparatus also includes a haptic feedback controller that determines the displacement current, where the displacement current is an effect of an amplitude of the haptic signal.

28 Claims, 4 Drawing Sheets

FEEDBACK FOR GROUNDING INDEPENDENT HAPTIC ELECTROVIBRATION

TECHNICAL FIELD

Embodiments disclosed herein are generally directed to haptic electrovibration and feedback.

BACKGROUND

Electrovibration-based haptics may refer to the use of an electrostatic force to provide one or more sensations to a user as, for example, the user's finger slides across the surface of a touch-sensitive screen. In an example, the user slides her finger across a surface of a touch-sensitive screen that employs electrodes, and an electric potential is applied to the electrodes. The quality of the grounding path between the source of the electric potential and the user significantly affects the quality and intensity of the haptic experience. It is therefore difficult to provide a consistent haptic experience to the user unless the system has an explicit ground connection with the user (e.g., there is a consistent grounding path to the user at all times).

A conventional solution to provide a consistent haptic experience to the user is to use wrist straps to ground the user. It is inconvenient, however, to require the user to wear additional equipment that is connected to the device. Another conventional technique is to require another finger or part of the user's hand to touch the device. This, however, may force the device to be held in a specific way, and again is inconvenient. Another conventional technique is to have no ground connection. This works if the signal is strong enough; however, this may still result in an inconsistent haptic experience for the user.

The user experience may also be different depending on factors that affect the grounding path including, for example, how the user is standing, whether the user is connected directly to the device, and whether the user is in contact with someone else.

SUMMARY

Methods, systems, and techniques are disclosed that enable an electrovibration-based haptic system to deliver a consistent haptic experience to the user. The present disclosure describes methods, systems, and techniques to provide a consistent haptic sensation to the user regardless of whether the system has or does not have a consistent ground connection with the user.

Consistent with some embodiments, there is provided an apparatus for providing haptic feedback. The apparatus includes a touch-sensitive screen capable of detecting a touch input and a set of electrodes. The apparatus also includes a haptic voltage signal generator capable of applying a haptic signal to the set of electrodes and capable of modifying the haptic signal based on a displacement current from the touch input to the set of electrodes. The apparatus also includes a haptic feedback controller capable of determining the displacement current. The displacement current is an effect of an amplitude of the haptic signal.

Consistent with some embodiments, there is provided a method of providing haptic feedback. The method includes applying a haptic signal to a set of electrodes in a device. The method also includes detecting, at a touch-sensitive screen of the device, a touch input. The method also includes determining a displacement current from the touch input to the set of electrodes. The displacement current is an effect of an amplitude of the haptic signal. The method also includes modifying the haptic signal based on the determined displacement current.

Consistent with some embodiments, an apparatus for providing tactile feedback includes means for applying a haptic signal to a set of electrodes. The apparatus also includes means for detecting a touch input. The apparatus also includes means for determining a displacement current from the touch input to the set of electrodes. The displacement current is an effect of an amplitude of the haptic signal. The apparatus also includes means for modifying the haptic signal based on the determined displacement current.

Figure 1:
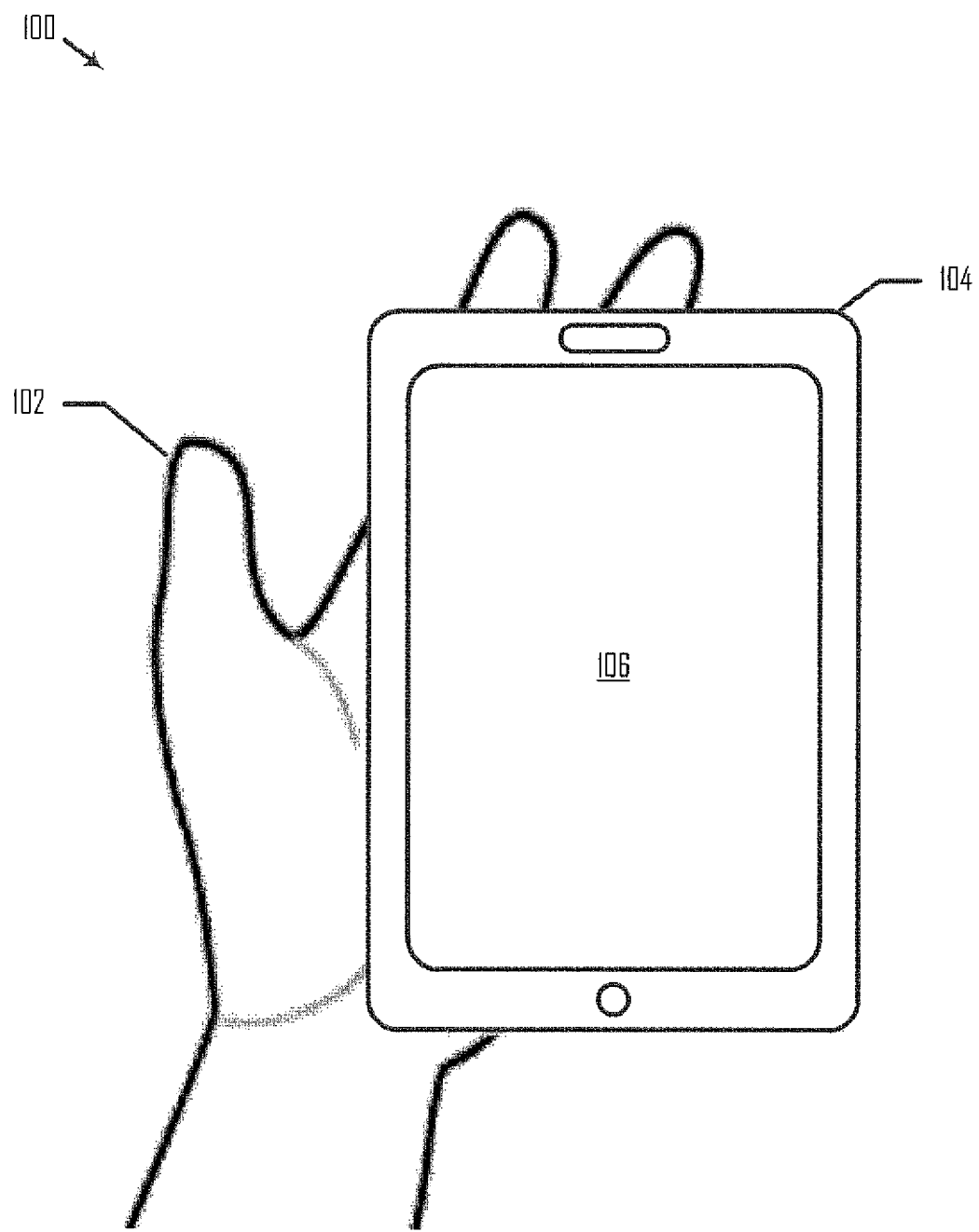
FIG. 1 is a diagram illustrating a user holding a device, consistent with some embodiments.

In the drawings, elements having the same designation have the same or similar functions.

DETAILED DESCRIPTION

In the following description specific details are set forth describing certain embodiments. It will be apparent, however, to one skilled in the art that the disclosed embodiments may be practiced without some or all of these specific details. The specific embodiments presented are meant to be illustrative, but not limiting. One skilled in the art may realize other material that, although not specifically described herein, is within the scope and spirit of this disclosure.

FIG. 1 is a diagram 100 illustrating a user 102 holding a device 104, consistent with some embodiments. As shown in FIG. 1, device 104 includes a touch-sensitive screen 106 that a user can use to interact with the device. Device 104 may include a haptic feedback system that provides user 102 with a consistent haptic experience.

Haptic electrovibration can convey a variety of haptic sensations via touch-sensitive screen 106 of device 104 to user 102 without having to physically change touch-sensitive screen 106. Haptic electrovibration may simulate the user's nerves so that touch-sensitive screen 106 feels differently. Haptic signals may be generated in an application-specific manner depending on, for example, the application or operating system (OS) developer and the desired effect of the user's sensation. The sensations may include, for example, device 104 having rough or slimy edges.

Figure 2:
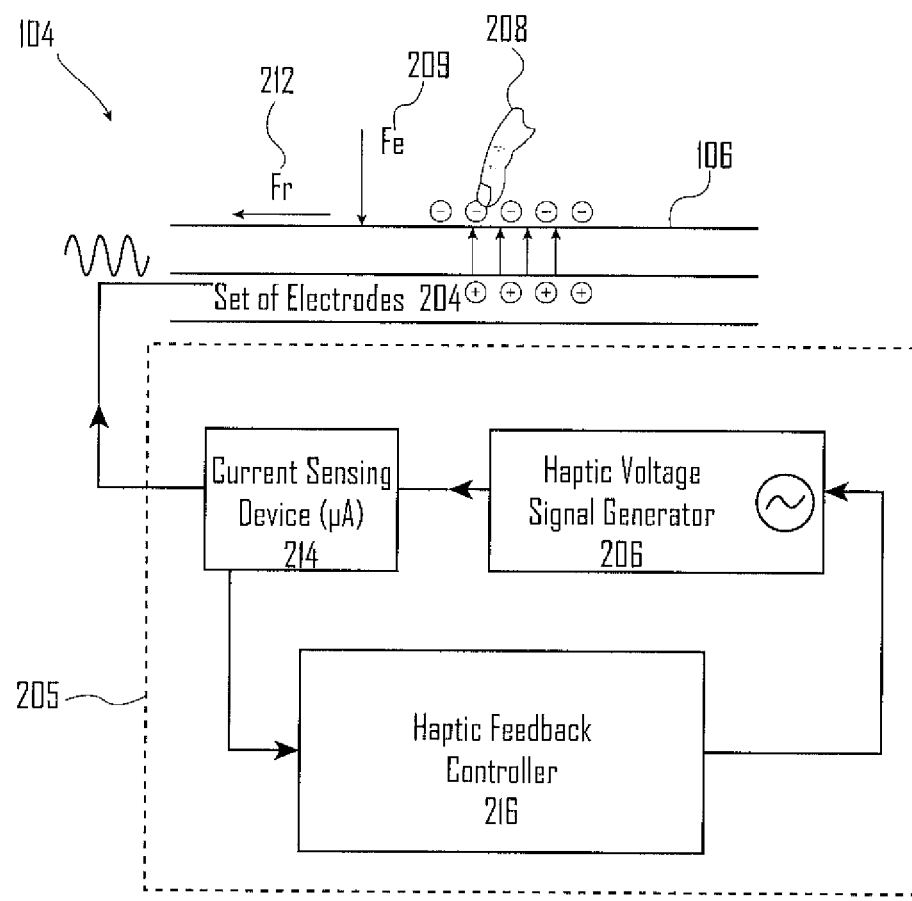
FIG. 2 is a diagram illustrating a device for providing haptic feedback to the user, consistent with some embodiments.

FIG. 2 is a diagram illustrating a device for providing haptic feedback to the user, consistent with some embodiments. The device may be device 104 in FIG. 1. As shown in FIG. 2, device 104 includes touch-sensitive screen 106 that a user's finger 208 may touch to interact with the device and a set of electrodes 204. Device 104 also includes a haptic feedback system 205 including a haptic voltage signal generator 206, current sensing device 214, and haptic feedback controller 216.

Haptic voltage signal generator 206 applies a haptic signal to set of electrodes 204. Set of electrodes 204 may be coated with a thin layer of insulator. In some embodiments, set of electrodes 204 may be a layer of transparent electrodes. Set of electrodes 204 in FIG. 2 may represent a set of electrodes that is distributed two-dimensionally about touch-sensitive screen 106. In an embodiment, set of electrodes 204 includes only a single layer or electrodes and is in a grid pattern that is not overlapping. In an embodiment, set of electrodes 204 includes a single electrode.

The cause of the haptic sensation is a measurable electric potential on set of electrodes 204 under the surface insulating layer. The current flows instantaneously on both sides of the interface including finger 208 and haptic voltage signal generator 206, but does not flow through the insulator. The current flows back and forth onto set of electrodes 204 and finger 208 on both sides, charging and discharging at a rate based on, for example, the user's touch and how the user is grounded. As finger 208 touches the surface of touch-sensitive screen 106, set of electrodes 204 and finger 208 form a two parallel-plate capacitor if finger 208 is grounded.

Ideally, if the user is connected to haptic feedback system 205's ground, the voltage on the fingertip is around 0V (with respect to set of electrodes 204). Because such connection does not exist, fingertip 208 may then be considered to be "floating" with respect to set of electrodes 204, and the voltage difference between fingertip 208 and set of electrodes 204 varies and may be difficult to predict.

Further, the quality of the grounding path between the source of the electric potential and the user may affect the quality and intensity of the haptic experience. For example, it may be difficult to provide a consistent haptic experience to the user unless there is a consistent ground path to the user at all times.

Depending on various factors, such as how the user holds device 104, a position of the user (e.g., whether the user is sitting or standing), the user's grounding (e.g., whether the user is touching device 104 on the ground or whether the user is wearing shoes or is barefoot), the manner in which the user is holding device 104 (e.g., whether the user is holding device 104 with one or two hands and the orientation in which the user is holding device 104), the electrical properties between the user and device 104 vary. Accordingly, the amount of current and its flow into set of electrodes 204 may be different, which affects the user's haptic experience. The current reflects the intensity of the sensation that the user feels. When the user is isolated from haptic feedback system 205, the user's experience is different based on, for example, whether or not the user has contact with a ground (e.g., wall or floor). Consequently, it may be difficult to generate a consistent tactile sensation for the user when the system does not have an explicit ground connection with the user. The present disclosure provides techniques to provide a consistent tactile sensation to the user.

A user's finger 208 may touch touch-sensitive screen 106. In some embodiments, touch-sensitive screen 106 may be a capacitive touch-sensitive screen that includes a layer of capacitive material to hold an electrical charge. In an example, haptic voltage signal generator 206 generates an electrical signal and applies a uniform potential on set of electrodes 204 across the dielectric in the capacitor such that the current flows into and out of the capacitor. The haptic signal may be generated in various ways. In some embodiments, haptic voltage signal generator 206 is a transformer or a digital-to-analog converter.

Current sensing device 214 may be capable of measuring current flowing from haptic voltage signal generator 206 to set of electrodes 204. The unit measurement for the current may be in microamps. In some embodiments, current sensing device 214 may include an ammeter that measures the electric current flowing from haptic voltage signal generator 206 to set of electrodes 204. In some embodiments, current sensing device 214 may include a series of resistors to measure current. For example, based on Ohm's Law, the voltage across the series of resistors may be proportional to a current flowing through current sensing device 214 such that the current can be determined based on a known voltage and a known resistance of the series of resistors.

When haptic voltage signal generator 206 applies a voltage to set of electrodes 204 and the user's finger 208 touches touch-sensitive screen 106, a force may be induced on finger 208 and an electric field 209 is created. In an electrovibration-based haptic system, device 104 may send a current to the user through an object the user is touching (e.g., touch sensitive screen 106) to ground. The strength of electrovibration is proportional to the electrostatic force acts on finger 208 by set of electrodes 204. This electrostatic force may be affected mainly by a voltage (e.g., haptic signal) between the user's touch (e.g., fingertip) and set of electrodes 204, insulator thickness, and dielectric of the insulator material. While the thickness and dielectric properties of the insulator material may remain constant, the voltage between the user's touch and set of electrodes 204 may vary. The difference depends on the potential on set of electrodes 204 and the potential on the user's touch. In some embodiments, the potential on set of electrodes 204 is controlled directly by haptic voltage signal generator 206.

The potential on finger 208, however, may be much more complicated. Friction force 212 modulates as electric field 209 changes across the insulator and the amount of charge changes at the point of contact of the user's touch. The modulation of friction force 212 may be due to the haptic signal and the changing energy voltages on set of electrodes 204 and how the current flows through finger 208.

To provide the user with a consistent haptic experience, it may be desirable to stabilize the modulation of friction force 212 so that it is constant. If the tactile sensation provided by friction force 212 that the user is feeling can be determined, it may be used to control the strength of the haptic signal and a more consistent sensation experience may then be delivered to the user. The haptic sensation experienced by the user may depend on how friction force 212 appears over time and as finger 208 moves over touch-sensitive screen 106. Friction force 212 may provide different sensations to different users based on various factors, such as how the user's brain works and his/her physiology. Thus, the effect of friction force 212 on individual users may be difficult to quantitatively measure.

The modulation of friction force 212 may be as a result of a user's touch and may instead be determined by observing a displacement current from the user's touch input to set of electrodes 204. Haptic voltage signal generator 206 may apply a haptic signal to set of electrodes 204, and the displacement current may be an effect of an amplitude of the applied haptic signal. Haptic feedback system 205 may infer what the user is experiencing based on the determined displacement current and modify the haptic signal accordingly. For example, the displacement current measurement indirectly informs feedback system 205 of the voltage between finger 208 and set of electrodes 204. As such, haptic feedback system 205 controls the voltage on set of electrodes 204 based on the displacement current to provide the user with a consistent haptic experience.

The magnitude of the displacement current into set of electrodes 204 is related to the sensation strength felt by the user. In an example, the user may feel a sensation from a range of frequencies from about 40 to 300 Hertz. By measuring the displacement current from device 104 to the user, the haptic signal strength generated by haptic voltage signal generator 206 may be adjusted to deliver a consistent sensation to the user.

In some embodiments, to determine the displacement current from the user's touch input to set of electrodes 204, haptic feedback controller 216 determines the displacement current into set of electrodes 204. By measuring the potential of set of electrodes 204 as, for example, the grounding path changes between the user and device 104, it may be determined whether device 104 is adapting to the grounding path changes.

Haptic feedback controller 216 may use current measurements from current sensing device 114 as input to provide a consistent haptic experience to the user. Haptic feedback controller 216 may control the haptic signal as a function of current measurements over time. Depending on various factors, such as how the user is grounded, different amounts of current flow into and out of set of electrodes 204. Haptic feedback controller 216 captures changes in the user's grounding and uses the current measurements to change the voltage signal generated by haptic voltage signal generator 206. This feedback may be useful for both a system that has explicit grounding to the user and a system that does not. The perceived effect may be maintained irrespective of changes in device 104 to user grounding.

Haptic feedback system 205 may monitor the user's interaction with touch-sensitive screen 106. Monitoring the user's interaction with touch-sensitive screen 106 may include, for example, detecting the user's touch input or detecting a grounding path change from the user to device 104.

Haptic voltage signal generator 206 modifies the haptic signal based on the determined displacement current. The modified haptic signal may be applied to set of electrodes 204. Haptic feedback controller 216 dynamically controls haptic voltage signal generator 206 with respect to controlling and modifying the voltage generated by haptic voltage signal generator 206. Haptic feedback controller 216 modifies the voltage generated by haptic voltage signal generator 206 based on the displacement current, thus providing the user with a consistent haptic experience when the user is touching touch-sensitive screen 106.

Haptic feedback system 206 may control a user's haptic experience based on an observed displacement current from the device to the user and based on observing the user's interaction with the device (e.g., by measuring the finger's vibration against the device or the electrical properties of the system). Haptic feedback system 205 includes a feedback loop, where the amplitude of the haptic signal is modified until the desired displacement current is achieved.

The displacement current may be used to determine a change of magnitude in the current. Consistent with some embodiments, haptic feedback controller 216 determines whether the displacement current indicates a change in current. In an example, haptic feedback system 205 may detect a change in a grounding path between a source of the haptic signal and the user (e.g, the touch input). When the change is detected, the amplitude of the haptic signal generated by haptic voltage signal generator 206 may be modified. The displacement current may be affected by the user's touch and/or a grounding path between a source of the haptic signal and the user. In some embodiments, when the displacement current is determined to indicate a change in current, haptic feedback controller 216 sends an indication to haptic voltage signal generator 206 to modify the amplitude of the haptic signal. The haptic signals may be implemented as a continuous-time control loop.

In an example, when the displacement current indicates a decrease in current magnitude, haptic feedback controller 216 sends an indication to haptic voltage signal generator 206 to increase the amplitude of the haptic signal. If the displacement current indicates a decrease in the current magnitude, then the user's tactile sensation has also decreased. To maintain the consistent haptic experience for the user, haptic voltage signal generator 206 responds to this change by increasing the amplitude of the signal to provide the user with a stronger sensation, thus improving the consistency of the user's tactile experience.

In another example, when the displacement current indicates an increase in current magnitude, haptic feedback controller 216 sends an indication to haptic voltage signal generator 206 to decrease the amplitude of the haptic signal. If the displacement current indicates an increase in the current magnitude, then the user's tactile sensation has also increased. To maintain the consistent haptic experience for the user, haptic voltage signal generator 206 responds to this change by decreasing the amplitude of the haptic signal to provide the user with a weaker sensation, thus improving the consistency of the user's tactile experience.

In another example, when the displacement current indicates a constant current magnitude, haptic feedback controller 216 sends an indication to haptic voltage signal generator 206 to maintain the amplitude of the haptic signal such that its amplitude remains approximately equal (or exactly equal) to its present amplitude. If the displacement current indicates a constant current magnitude, then the user's tactile sensation has remained consistent. To maintain this consistent haptic experience for the user, haptic voltage signal generator 206 maintains the amplitude of the haptic signal at its approximately current (or the same) value. Accordingly, the user's tactile sensation may remain relatively consistent.

In some embodiments, after haptic voltage signal generator 206 modifies the amplitude of the haptic signal based on a first displacement current, haptic feedback controller 216 determines a second displacement current into set of electrodes 204. The second displacement current is an effect of an amplitude of the modified haptic signal. Determining the first displacement current may include determining the first displacement current at a first point in time, and determining the second displacement current may include determining the second displacement current at a second point in time subsequent to the first point in time.

Haptic voltage signal generator 206 may modify the amplitude of the haptic signal based on the determined second displacement current. When the second displacement current indicates a decrease in current magnitude, haptic voltage signal generator 206 may increase the amplitude of the haptic signal. Further, when the second displacement current indicates an increase in current magnitude, haptic voltage signal generator 206 may decrease the amplitude of the haptic signal. Additionally, when the second displacement current indicates a constant current magnitude, haptic voltage signal generator 206 may maintain the present (or approximately equal) amplitude of the haptic signal.

Haptic feedback system 205 includes a feedback loop, where the amplitude of the haptic signal may be continuously modified until the desired displacement current is achieved (e.g., when the displacement current indicates that the magnitude of the current is relatively consistent). In an example, haptic feedback controller 216 may continue to send indications to haptic voltage signal generator 206 to modify the haptic signal by varying its amplitude, and the modification may be based on additional displacement currents. When the desired displacement current is achieved, haptic feedback controller 216 may send an indication to haptic voltage signal generator 206 to continue to generate haptic signals at that particular amplitude.

Device 104 may continue to monitor the user's interaction with touch-sensitive screen 106. Monitoring the user's interaction with touch-sensitive screen 106 may include, for example, detecting the user's touch input or detecting a grounding path change from the user to device 104. Accordingly, the amplitude of the haptic signals generated by haptic voltage signal generator 206 may subsequently change (e.g., be increased or decreased). For example, haptic feedback controller 216 may determine a displacement current that indicates a change in the magnitude of the current and may send an indication to haptic voltage signal generator 206 to modify the amplitude of the haptic signal based on the determined displacement current, thus continuously providing a consistent haptic experience to the user.

In some embodiments, device 104 includes a micro-controller (not shown) that includes haptic feedback system 205. In some embodiments, device 104 is a mobile device. The mobile device may be, for example, a smartphone, tablet, opaque surface, or aid for the visually impaired.

Figure 3:
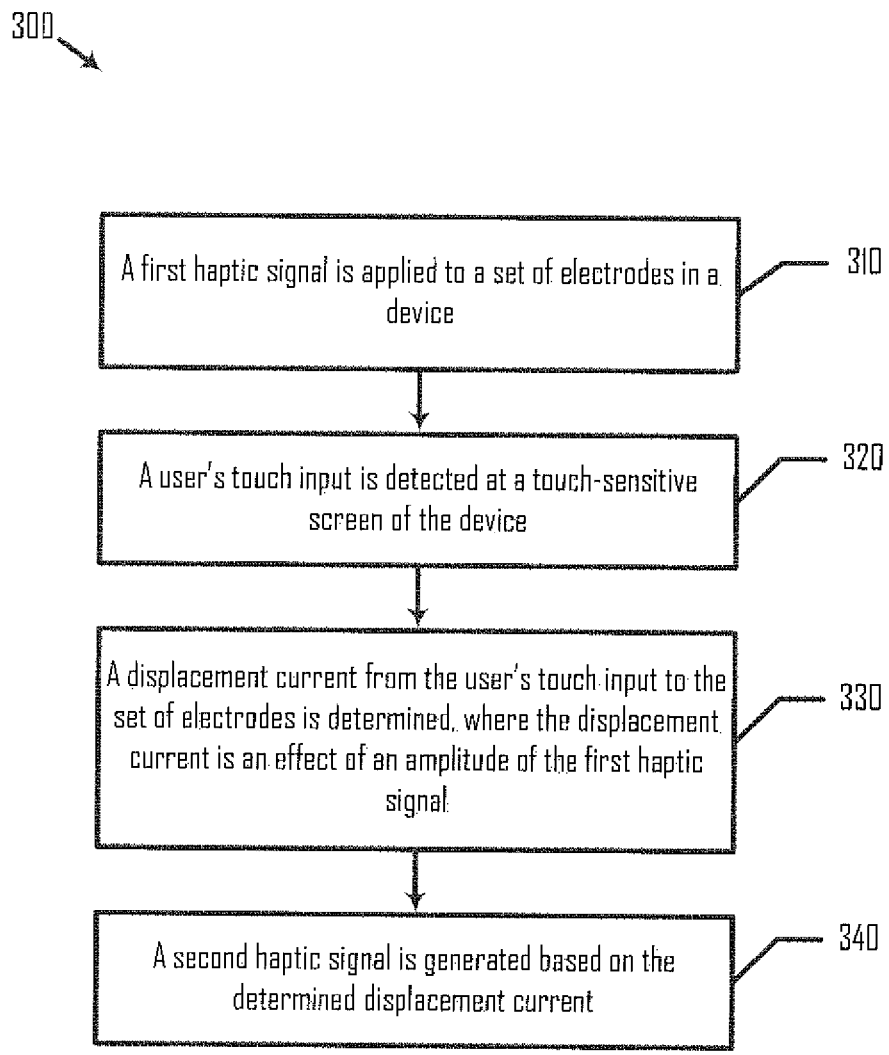
FIG. 3 is a diagram illustrating a method of providing haptic feedback to the user, consistent with some embodiments.

FIG. 3 is a diagram illustrating a method 300 of providing tactile feedback to the user, consistent with some embodiments. Method 300 is not meant to be limiting and may be used in other applications.

Method 300 includes steps 310-340. In a step 310, a haptic signal is applied to a set of electrodes in a device. In an example, haptic voltage signal generator 206 applies a haptic signal to set of electrodes 204 in device 104. In a step 320, a touch input is detected at a touch-sensitive screen of the device. In an example, touch-sensitive screen 106 detects a touch input (e.g., a user's touch input). In a step 330, a displacement current from the touch input to the set of electrodes is determined, where the displacement current is an effect of an amplitude of the haptic signal. In an example, haptic feedback controller 216 determines a displacement current from the touch input (e.g., a user's touch input) to set of electrodes 204, where the displacement current is an effect of an amplitude of the haptic signal. In a step 340, the amplitude of the haptic signal is modified based on the determined displacement current. In an example, haptic voltage signal generator 206 modifies the haptic signal based on the determined displacement current. The haptic signal may be implemented as a continuous-time control loop.

It is also understood that additional method steps may be performed before, during, or after steps 310-340 discussed above. It is also understood that one or more of the steps of method 300 described herein may be omitted, combined, or performed in a different sequence as desired.

Figure 4:
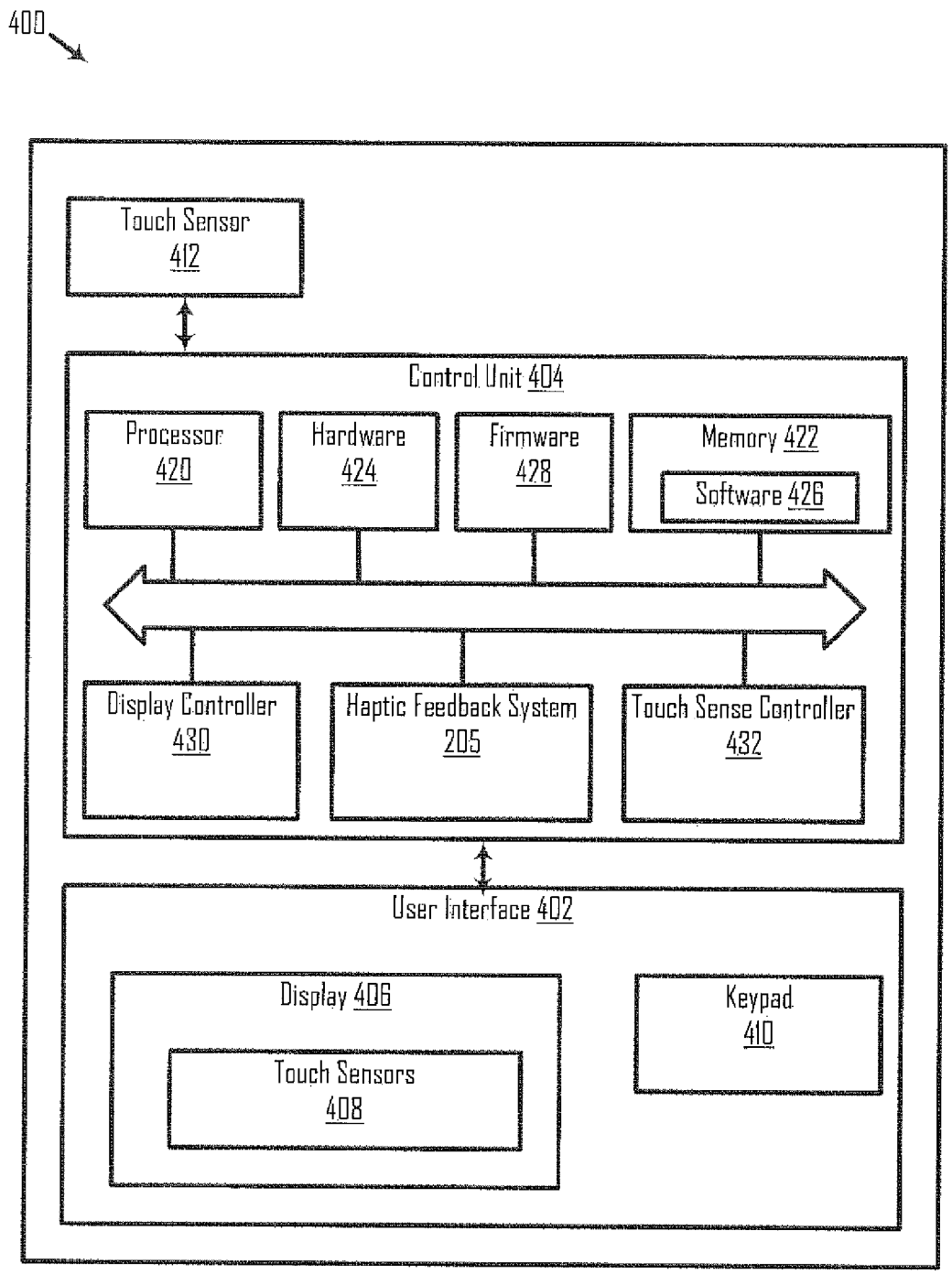
FIG. 4 is a diagram illustrating a platform capable of providing haptic feedback to the user, consistent with some embodiments.

FIG. 4 is a diagram illustrating a platform capable of providing haptic feedback to the user, consistent with some embodiments.

Device 104 may run a platform 400. Platform 400 includes a user interface 402 that is in communication with a control unit 404, e.g., control unit 404 accepts data from and controls user interface 402. User interface 402 includes display 406, which includes a means for displaying graphics, text, and images, such as an LCD or LPD display, and may include a means for detecting a touch of the display, such as touch sensors 408 (e.g., capacitive touch sensors).

User interface 402 may further include a keypad 410 or other input device through which the user can input information into the platform 400. If desired, keypad 410 may be obviated by integrating a virtual keypad into display 406. It should be understood that with some configurations of platform 400, portions of user interface 402 may be physically separated from control unit 404 and connected to control unit 404 via cables or wirelessly, for example, in a Bluetooth headset. Touch sensor 412 may be used as part of user interface 402 by detecting a touch input from a user via display 406.

Platform 400 may include means for applying a haptic signal to a set of electrodes. Platform 400 may further include a means for determining a displacement current from the user's touch input to the set of electrodes, the displacement current being an effect of an amplitude of the haptic signal. Control unit 404 accepts and processes data from user interface 402 and touch sensor 412 and controls the operation of the devices, including the generation and modification of haptic signals. Platform 400 may further include means for modifying the haptic signal based on the determined displacement current, and thus, serves as a means for providing a haptic feedback to the user.

Control unit 404 may be provided by one or more processors 420 and associated memory 422, hardware 424, software 426, and firmware 428. Control unit 404 includes a means for controlling display 406, means for controlling touch sensors 412, and means for controlling the haptic signals, illustrated as a display controller 430, touch sensor controller 432, and haptic feedback system 205, respectively. Display controller 430, touch sensor controller 432, and haptic feedback system 205 may be implanted in processor 420, hardware 424, firmware 428, or software 426, e.g., computer readable media stored in memory 422 and executed by processor 420, or a combination thereof. Display controller 430, touch sensor controller 432, and haptic feedback system 205 nevertheless are illustrated separately for clarity.

As discussed above and further emphasized here, FIGS. 1-4 are merely examples that should not unduly limit the scope of the claims. For example, although a haptic system including a display and a touch sensor is illustrated in FIG. 4, this is not intended to be limiting. It will be understood that a haptic system including only a set of electrodes (e.g., a layer of electrodes) and a layer of insulator on top of the set of electrodes is within the scope of the present disclosure. Further, the haptic feedback system may or may not use the user's touch input information to modify the haptic signal having a given amplitude. In an example, the haptic feedback system does not use the user's touch input information and may modify the haptic signal having the given amplitude based on reading the current from the set of electrodes.

It will also be understood as used herein that processor 420 can, but need not necessarily include, one or more microprocessors, embedded processors, controllers, application specific integrated circuits (ASICs), digital signal processors (DSPs), graphics processing units (GPUs), and the like. The term processor is intended to describe the functions implemented by the system rather than specific hardware. Moreover, as used herein the term "memory" refers to any type of computer storage medium, including long term, short term, or other memory associated with the platform, and is not to be limited to any particular type of memory or number of memories, or type of media upon which memory is stored.

The methodologies described herein may be implemented by various means depending upon the application. For example, these methodologies may be implemented in hardware 424, firmware 428, software 426, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in memory 422 and executed by the processor 420. Memory may be implemented within the processor unit or external to the processor unit.

For example, software 426 may include program codes stored in memory 422 and executed by processor 420 and may be used to run the processor and to control the operation of platform 400 as described herein. A program code stored in a computer-readable medium, such as memory 422, may include program code to apply a haptic signal to a set of electrodes in a device, detect a user's touch input, determine a displacement current from the user's touch input to the set of electrodes, the displacement current being an effect of an amplitude of the haptic signal, and modify the haptic signal based on the determined displacement current. The program code stored in a computer-readable medium may additionally include program code to cause the processor to control any operation of platform 400 as described further below.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

One skilled in the art may readily devise other systems consistent with the disclosed embodiments which are intended to be within the scope of this disclosure.

What is claimed is:

1. A method of providing tactile feedback, comprising:
   applying a haptic signal to a set of electrodes in a device;
   detecting, at a touch-sensitive screen of the device, a touch input;
   determining a displacement current from the touch input to the set of electrodes, the displacement current being an effect of an amplitude of the haptic signal and being based on a charge and discharge rate between a two parallel-plate capacitor, and the two-parallel plate capacitor being defined by the touch input and the set of electrodes; and
   modifying the haptic signal based on the determined displacement current.

2. The method of claim 1, wherein modifying the haptic signal comprises:
   modifying the haptic signal as the detected displacement current changes.

3. The method of claim 1,
   wherein modifying the haptic signal includes increasing the amplitude of the haptic signal when the displacement current indicates a decrease in current magnitude.

4. The method of claim 1,
   wherein modifying the haptic signal includes decreasing the amplitude of the haptic signal when the displacement current indicates an increase in current magnitude.

5. The method of claim 1,
   wherein modifying the haptic signal includes maintaining the amplitude of the haptic signal when the displacement current indicates a constant current magnitude.

6. The method of claim 1, further comprising:
   determining whether the displacement current indicates a change in current, wherein modifying the haptic signal includes modifying the amplitude of the haptic signal when the displacement current is determined to indicate the
   change in current.

7. The method of claim 1, further comprising:
   determining a second displacement current into the set of electrodes, the second displacement current being an effect of an amplitude of the modified haptic signal and being based on the charge and discharge rate between the two parallel-plate capacitor; and
   modifying the haptic signal based on the determined second displacement current.

8. The method of claim 7, wherein determining the first displacement current includes determining the first displacement current at a first point in time, and determining the second displacement current includes determining the second displacement current at a second point in time subsequent to the first point in time.

9. The method of claim 8, wherein a grounding path between a source of the haptic signal and the touch input at the first point in time is different from a grounding path between the source of the haptic signal and the touch input at the second point in time.

10. The method of claim 1, further comprising:
    detecting a change in a grounding path between a source of the haptic signal and the touch input of a user, wherein modifying the haptic signal includes modifying the amplitude of the haptic signal when the change is detected, and wherein the charge and discharge rate is defined by the touch input and a grounding configuration of the user.

11. The method of claim 1, further comprising:
    applying the modified haptic signal to the set of electrodes.

12. The method of claim 1, wherein applying the haptic signal includes uniformly applying the haptic signal to the set of electrodes.

13. The method of claim 1, wherein the displacement current is based on the touch input and a grounding path between a source of the haptic signal and the touch input.

14. The method of claim 1, wherein applying the haptic signal includes generating a potential on the set of electrodes.

15. The method of claim 1, wherein the touch input is from a user's finger, and applying the haptic signal induces a force on the user's finger.

16. The method of claim 1, further comprising:
    monitoring touch inputs with the touch-sensitive screen, wherein monitoring includes detecting the touch input.

17. An apparatus for providing tactile feedback, comprising:
    a touch-sensitive screen that detects a touch input;
    a set of electrodes;

a haptic voltage signal generator that applies a haptic signal to the set of electrodes and modifies the haptic signal based on a displacement current from the touch input to the set of electrodes; and a haptic feedback controller that determines the displacement current, wherein the displacement current is an effect of an amplitude of the haptic signal and is based on a charge and discharge rate between a two parallel-plate capacitor, and wherein the two-parallel plate capacitor is defined by the touch input and the set of electrodes.

18. The apparatus of claim 17, wherein the apparatus is a mobile device.

19. The apparatus of claim 18, wherein the mobile device is at least one of a smartphone, tablet, opaque surface, and aid for the visually impaired.

20. The apparatus of claim 17, wherein the touch-sensitive screen is a capacitive touch-sensitive screen.

21. The apparatus of claim 17, wherein the haptic voltage signal generator generates electrical signals.

22. The apparatus of claim 17, wherein the haptic voltage signal generator generates a potential on the set of electrodes.

23. The apparatus of claim 17, wherein the haptic feedback controller controls the amplitude of the haptic signal generated by the haptic voltage signal generator.

24. The apparatus of claim 17, wherein the haptic voltage signal generator is at least one of a transformer and a digital-to-analog converter.

25. The apparatus of claim 17, further comprising:
an ammeter that uses a series of resistors to measure current.

26. The apparatus of claim 17, further comprising:
a micro-controller including the haptic feedback controller.

27. An apparatus for providing tactile feedback, comprising:
means for applying a haptic signal to a set of electrodes in a device;
means for detecting a touch input;
means for determining a displacement current from the touch input to the set of electrodes, the displacement current being an effect of an amplitude of the haptic signal and being based on a charge and discharge rate between a two parallel-plate capacitor, and the two-parallel plate capacitor being defined by the touch input and the set of electrodes; and
means for modifying the haptic signal based on the determined displacement current.

28. A computer program product in a device, comprising:
a non-transitory computer-readable medium comprising code for:
applying a haptic signal to a set of electrodes in a device;
detecting a touch input;
determining a displacement current from the touch input to the set of electrodes, the displacement current being an effect of an amplitude of the haptic signal and being based on a charge and discharge rate between a two parallel-plate capacitor, and the two-parallel plate capacitor being defined by the touch input and the set of electrodes; and
modifying the haptic signal based on the determined displacement current.

* * * * *